(12) United States Patent
Julton

(10) Patent No.: US 8,516,760 B2
(45) Date of Patent: Aug. 27, 2013

(54) STUDDED PLATE WITH FELT

(75) Inventor: Svein Julton, Kongsberg (NO)

(73) Assignee: Isola AS, Notoddne (NO)

(*) Notice: Subject to any disclaimer, the term of this patent is extended or adjusted under 35 U.S.C. 154(b) by 0 days.

(21) Appl. No.: 12/746,327

(22) PCT Filed: Dec. 5, 2008

(86) PCT No.: PCT/NO2008/000433
§ 371 (c)(1),
(2), (4) Date: Aug. 24, 2010

(87) PCT Pub. No.: WO2009/072899
PCT Pub. Date: Jun. 11, 2009

(65) Prior Publication Data
US 2010/0300024 A1    Dec. 2, 2010

(30) Foreign Application Priority Data
Dec. 5, 2007  (NO) .................................. 20076267

(51) Int. Cl.
*E04C 1/00*    (2006.01)
(52) U.S. Cl.
USPC .......... 52/309.8; 52/302.3; 52/388; 52/169.5; 52/169.14; 428/174
(58) Field of Classification Search
USPC ............... 52/309.8, 309.9, 309.11, 388, 389, 52/390, 169.5, 169.14, 302.3; 428/156, 174
See application file for complete search history.

(56) References Cited

U.S. PATENT DOCUMENTS

| 3,479,779 | A | * | 11/1969 | Ziegler | 52/144 |
| 4,730,953 | A | * | 3/1988 | Tarko | 405/45 |
| 5,044,821 | A | * | 9/1991 | Johnsen | 405/50 |
| 5,532,039 | A | * | 7/1996 | Payne et al. | 428/116 |
| 5,743,056 | A | * | 4/1998 | Balla-Goddard et al. | 52/309.11 |
| 5,775,039 | A | * | 7/1998 | McPherson | 52/169.5 |
| 5,860,259 | A | | 1/1999 | Laska | |
| 6,188,839 | B1 | * | 2/2001 | Pennella | 392/435 |
| 6,523,309 | B1 | * | 2/2003 | Finlay et al. | 52/169.5 |
| 7,033,666 | B2 | * | 4/2006 | Skaja | 428/178 |
| 7,181,888 | B1 | * | 2/2007 | Facaros | 52/169.5 |
| D587,358 | S | * | 2/2009 | Stephan et al. | D23/314 |
| 7,585,556 | B2 | * | 9/2009 | Julton | 428/156 |
| 2005/0229520 | A1 | * | 10/2005 | Julton | 52/443 |

(Continued)

FOREIGN PATENT DOCUMENTS
DE    9414587    12/1994
DE    43 41 076    6/1995

(Continued)

OTHER PUBLICATIONS

Norwegian Search Report corresponding to Norway 20076267, mailing date Jun. 11, 2008, 1 page.

(Continued)

*Primary Examiner* — Brian Glessner
*Assistant Examiner* — Brian D Mattei
(74) *Attorney, Agent, or Firm* — Myers Bigel Sibley & Sajovec, P.A.

(57) ABSTRACT

An insulating plate/studded plate with moisture absorbing/capillary absorbent properties is described, where the plate comprises a layer of a waterproof material such as a plastic material whereon an absorbing material, such as a felt material is adhered.

10 Claims, 6 Drawing Sheets

(56) References Cited

U.S. PATENT DOCUMENTS

| | | | |
|---|---|---|---|
| 2006/0260233 A1* | 11/2006 | Schluter | 52/302.3 |
| 2008/0236077 A1* | 10/2008 | O'Reilly | 52/309.8 |
| 2010/0300032 A1* | 12/2010 | Kang | 52/612 |

FOREIGN PATENT DOCUMENTS

| | | |
|---|---|---|
| DE | 297 02 425 U1 | 6/1997 |
| DE | 297 13 226 U1 | 11/1997 |
| DE | 201 15 009 | 1/2002 |
| JP | 409184277 | 7/1997 |
| NO | 313942 | 10/1999 |
| NO | 320438 | 12/2005 |

OTHER PUBLICATIONS

Notification of Transmittal of International Preliminary Report on Patentability corresponding to PCT/NO2008/000433, mailing date Mar. 5, 2010, 19 pages.

* cited by examiner

STUDDED PLATE WITH FELT

RELATED APPLICATIONS

The present application is a 35 U.S.C. §371 national phase application of PCT International Application No. PCT/NO2008/000433, filed Dec. 5, 2008, which claims priority from Norwegian Patent Application No. 20076267, filed Dec. 5, 2007, the disclosures of which are hereby incorporated herein by reference in their entireties. The above PCT International Application was published in the English language and has International Publication No. WO 2009/072899 A1.

BACKGROUND FOR THE INVENTION

The present invention relates to an insulating plate/studded plate with moisture absorbing/up-drawing qualities, alternatively sound absorbing or energy reflecting/transforming qualities, where a layer of absorbing/up-drawing/transforming material such as felt or a felt-like woven or non-woven material is applied with a basic layer of a compact plate material of a synthetic material such as a plastic material, where the synthetic material comprises a number of bulges, such as bulges in the form of studs, where the moisture absorbing/up-drawing/transforming material is added to the basic layer in such a way that the layer material is tightly connected with the basic layer in any point of it.

A lot of buildings are at the present build in concrete or concrete based material, especially in the structure towards the ground, where the concrete composition and the hardened concrete lies in direct contact with surrounding soil, stone, clay and rock mass material, and this contributes to a long drying period for the construction material. Due to the moisture, it will not be advantageous to lay floor material such as laminate or parquet directly on such concrete. It is therefore necessary to use a membrane material between the concrete and the flooring to avoid e.g. rot attacks, penetration of moisture, general weakening of the flooring etc and to this end it is often used studded plates providing a gap in the form of channels between the concrete and the flooring. The studs in such studded plates can have many different designs, such as four-sided, round, polygonal etc and be with or without projections.

Cement/concrete/reinforced concrete also being used in floors above ground contain moisture, comprising e.g. floors/ceilings made of a slightly expanding clay aggregate concrete and light weight concrete, plaster based floors/walls/ceilings, concrete modules with floating floorings, floating floors of laminate or parquet, floors with plaster/cement based screed material etc. The moisture in the concrete elements and/or other concrete is often invisible and hard to detect, and without a membrane and airing possibilities between the concrete and the floor covering, there will over time be a risk for attack from rot, moisture damages etc.

By the arrangement of a sealing/isolation coating in buildings, it can be relevant to obtain moisture channelling/draining properties in this layer. In the process of laying floor, ceiling or wall sealing between the outer and inner covering/surface of the floor/ceiling/wall or as a part of a structure in the form of a sound and/or moisture insulation, it is common to use studded plates to obtain the isolating layer. Such layers can often be arranged in relation with other insulation, such as plates in the form of mineral wool, polystyrene or other. In many cases, such as e.g. in the construction of "green roofs" (turfed roofs, roofs with plantation etc.), it may sometimes be desirable to channel up and possibly evaporate moisture to promote favourable growth conditions. To this end, there are different solutions for mats with a water absorbing or evaporating layer.

PRIOR ART

To solve the above mentioned problems it is commercially available or described different types of plates with a water conducting layer applied to a leak proof substrate of a polymeric material.

It is thereby known for e.g. European Patent Application No. 051116589, Norwegian Patent No. 177940 and US Patent Application No. 2006/0260233, a floor construction with a studded plates with channels between the studs and where a coating as arranged as a layer over the plates.

Corresponding types of studded plates with an associated layer where a water proof basic layer is applied with a porous and woven or non-woven layer in the form of a plane substrate attached to the top of each stud or a number of such studs is correspondingly known from the market. In a sequence of such plates, the plane layer of a porous, woven or non-woven material is meant as a separating and filtrating layer and moisture as well as condensate is lead in channels created between the studs of the studded plate. Therefore, such moisture is normally not absorbed by the porous layer.

In cases where the studded plate is used for collecting and deposition of water in "green roofs", that is roofs with arrangements to obtain some sort of vegetation on the roof surface, the supply of water to the vegetation is based on evaporation through the cloth or fabric arranged over the studded plate. If the temperature difference between the water deposits and vegetation is not sufficiently high, one can experience that the water do not evaporate sufficiently, so that the plants risk to dry up. It is therefore a desire to find a better way to transport water from the deposits in the studded plates to the vegetation over the water permeable substrate.

Furthermore, it should be noted that studded plates used on "green roofs" will also have a moisture isolating function.

To solve the above mentioned problems with sound absorbing layers, such layers are applied with a partly free lying sound absorbing material. Polyethylene foil (PE foil) applied with foam is known as a sound absorbing product in floor constructions. Studded plates with an adhesive applied with a foam layer of the above mentioned type is also known to have sound and/or heat insulating qualities.

There are studded plates with felt or felt-like woven or non-woven material applied to the underside in the form of a plane substrate, for example in European Patent Application No. 051116589 and U.S. Pat. No. 6,434,901. In these cases, the felt has only glue absorbing and binding functions. The felt will then ensure a better grip between the peaks of the studs, where the felt is attached, and the glue the studded plate is applied on.

The present invention relates to an insulating plate/studded plate with moisture absorbing qualities, alternatively sound absorbing or energy reflecting/converting features, where a layer of a moisture absorbing/channelling/modifying material such as felt or a felt-like woven or non-woven material is applied a basic layer of a leak proof plate material of a synthetic material such as a plastic material, where the synthetic material comprises a number of bulges, such as bulges in the form of studs, where the moisture absorbing/channelling/modifying layer material is added to the basic layer, so that the layer material is closely connected with and/or integrated in the basic layer in every point of it or a large part of it in such a way that the layer material follow the contour of the surface of the studded plate.

From what is explained above, there is therefore a need for a studded plate with a closely associated layer of a water absorbing/water channelling/energy converting material, where this absorbing/channelling/converting material follow the surface contour of the studded plate to form such water channelling layer with a surface as large as possible in relation to the studded plate. The advantage of forming the water absorbing/water channelling/light absorbing/energy converting material in close relation with the basic layer in the form of a plate with bulges (for example a studded plate), is that the surface of the water absorbing/water channelling/energy converting layer this way, has a surface as large as possible to be able to absorb as much of the moisture as possible, while thereby making a possible evaporation from a detached layer as large as possible. The difference between the present plate construction with water absorbing/water channelling properties and insulation plates according to prior art, is that the prior art was focused on leading moisture away from the floor/ceiling/wall construction, while the plate according to the present invention may have as an object to absorb the moisture in an as large extent as possible, before possible excess moisture is lead away.

When studded plates are used in floors or similar load carrying surfaces, one will, in some cases, attach at least one side of the studded plate with an adhesive material, such as glue, to the adjacent surface in such a way that the studs are filled with the adhesive material or glue. Thereby, load carrying columns are formed by the glue. However, the largest part of the grip between the adjacent surface and the studded plate, will be in a limited area of each stud. It is therefore a desire to find a way to improve the grip between the studded plate and the adjacent surfaces the studded plate is attached to.

Thereby, an other function of the absorbing layer is to bind several layers together in a construction, for example to adhere tiles and tile adhesive to the plate. The advantage of forming the absorbing material in intimate relation with the basic layer in the form of a plate with bulges (for example a studded plate) is that, in this way, the surface of the absorbing layer obtain a surface as large as possible to increase the adhesive properties.

It is formerly known methods to apply felt material to a substrate of synthetic material. From the car industry it is known methods for application of felt on substrates of plastic and cardboard. Such application may, for example, be carried out by gluing the felt on the substrate, or in the case of a plastic substrate, to apply felt sliver when the plastic substrate is in a half melted state, so that the felt sliver attaches to or in the surface of the substrate. It may also by possible to apply woven/non-woven/foamed material by the means of flame laminating or hot-melt adhesive. Such manners of fastening can also be used in the production of studded plates according to the invention.

Alternatively, it can be possible to apply a mainly plane layer of the absorbing material (the felt) to the head of the studs of the basic layers, and thereafter cut the absorbing material in the areas where it is not obtained an adhesion (the hollow spaces under the felt) and thereafter press the cut areas down into the hollow spaces and bind it to the basic layer. This way, a uncovered area is obtained at the bottom of each hollow space, but the absorbing material will still be able to perform its channelling function by a wicking or capillary effect, or alternatively a separate sliver material can be applied and glued tot the bottom of the hollow spaces to provide a continuous layer of moisture absorbing material. It can also be envisaged a number of parallel strips or bands of absorbing material passing over the studded plate and forming a connecting band system between neighbouring studs, so that each row of studs are connected by an absorbing and water channelling strip of felt or other woven or non-woven material.

Formerly known felt covered substrates are not used for any other that cosmetic or adjusting purposes and/or sound absorbing layers (for example as silencer in car parts) and are not meant to function as moisture channelling substrates in any way, and rather the opposite, as moisture over time will destroy such substrates, if they consists of basic layers based on cellulose (cardboard, chip board or the like).

GENERAL DESCRIPTION OF THE INVENTION

The present invention thereby relates to an insulating plate/studded plate with moisture absorbing/channelling properties, alternatively sound absorbing and/or energy reflecting/converting properties, where a layer of a moisture absorbing/moisture channelling/converting material such as felt or a felt-like woven or non-woven material or a foamed material, where this material comprises open and/or closed cells or pores, as applied to a basic layer of an impermeable plate material of a synthetic material such as a plastic material, where the synthetic material comprises a number of bulges such as bulges in the form of studs, wherein the moisture absorbing/moisture channelling/converting layer material is applied to the basic layer so that the layer material is tightly connected to the basic layer in any point of is.

Furthermore, the invention relates to the use of such plate as an isolating/water channelling layer in a floor, wall, and/or roof construction as a moisture channelling and/or sound isolating/energy converting layer. Such plates are particularly suitable as drainage plates in the construction of "green" roofs, that is roofs with an outer bed of crop (plants), where such plants are supplied with moisture for growth from the moisture absorbing material present on the impermeable layer of synthetic material (plastic, polymeric material).

Examples of constructions where the plates according to the present invention are used, are shown in the attached figures where:

FIG. 2 shows in cross section a floor construction of an outside glued floor/cover with drainage, where a studded plate according to the invention is arranged between the upper floor cover (tiles or other non-organic material) and the foundation (concrete floor) with upper layers of the constructions such as moisture membrane and the like;

Figure 1:
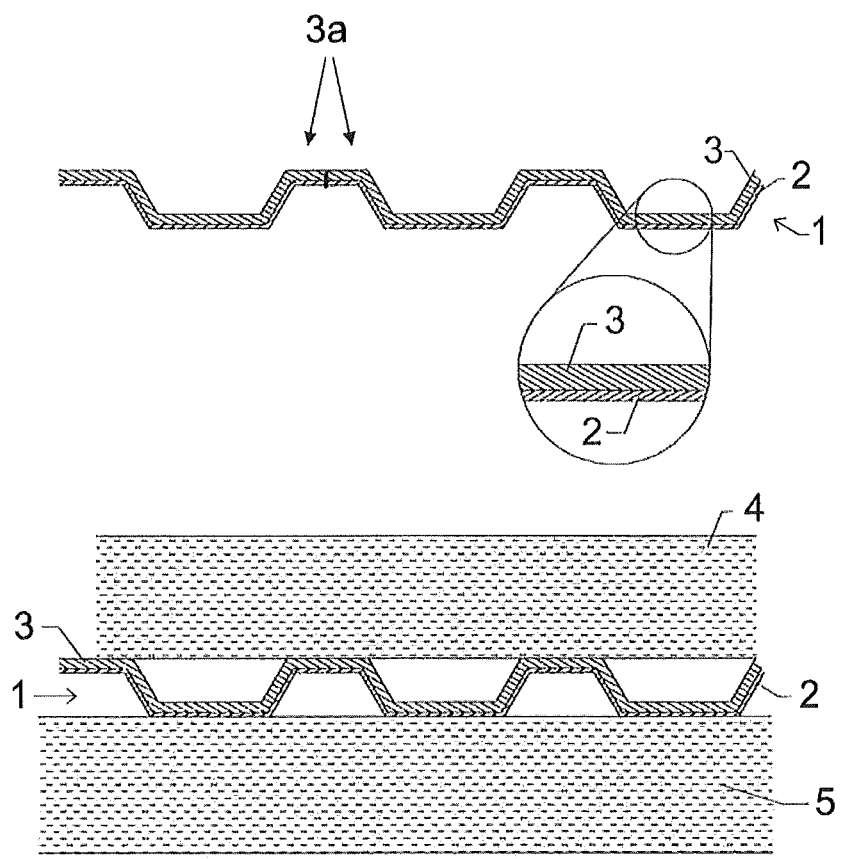
FIG. 1 shows a cross section of a floor construction of a floating floor with a studded plate with integrated felt present between the upper layer (parquet/laminate) and the foundation (concrete floor) and where the construction is shown with the other fastening/isolating layers.

As mentioned above, FIG. 1 shows a cross section of a construction of a floating floor where a studded plate 1, including a layer of synthetic polymeric material 2 (polyethylene, polypropylene) with a layer of integrated felt 3, is present between the upper layer 4 (parquet/laminate) and the foundation 5 (concrete floor). In this structure, the floor covering 4 is not attached to the studded plate 1, but is lying loosely on the felt layer 3 of the studded plate 1, so that the felt covering function as a sound absorbing and heat insulating layer. Moisture that may exist in the concrete foundation 5 of the floor, will be prevented from penetrating the studded plate 1 through the layer of synthetic material 2.

Figure 2:
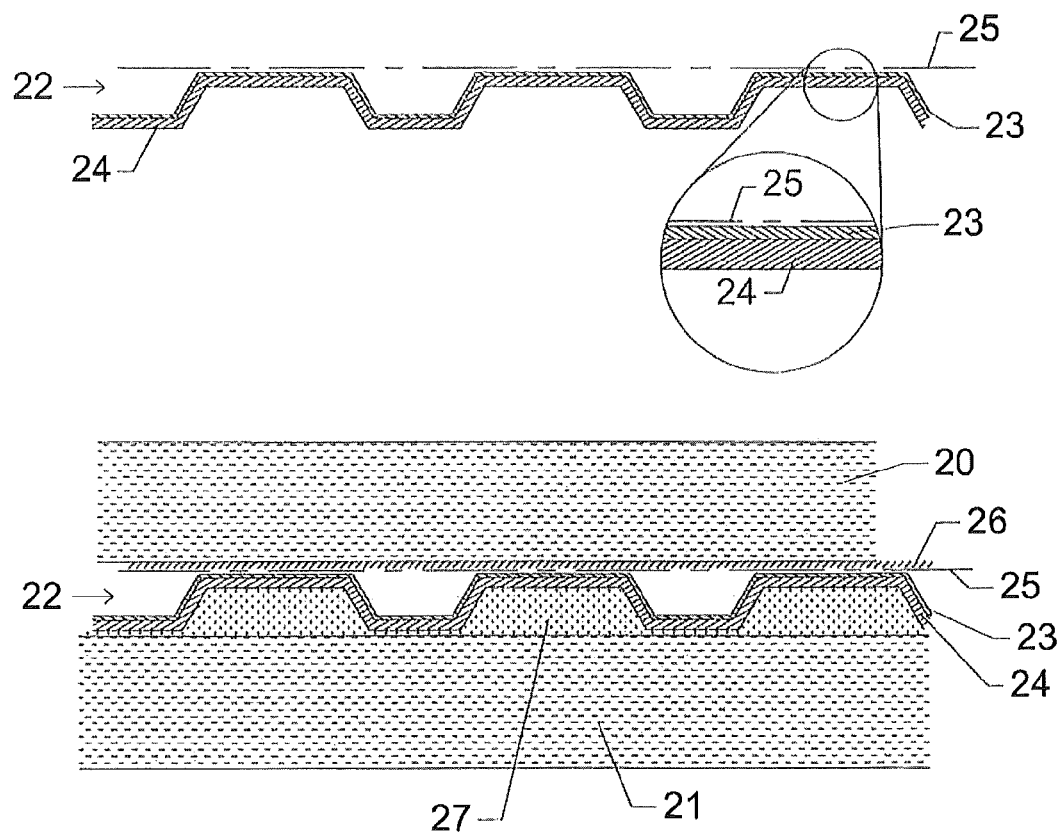

An alternative floor construction is shown in FIG. 2 showing in cross section a floor construction of an external glued floor/covering with drainage, where a studded plate 22 according to the invention is arranged between the upper floor covering 20 (tiles or other non-organic material) and the foundation 21 (concrete floor). The studded plate 22 here includes a polymeric moisture impermeable layer of polymeric material 23 (e.g. polyethylene, polypropylene, etc.) and with a felt layer 24 facing the concrete foundation 21 and with the moisture impermeable layer 23 facing the upper floor covering 20. Between the studded plate 22 and the upper floor covering 20, facing the studded plate 22 and on top of the moisture impermeable polymeric material 23, there is arranged a fibre cloth or mesh or other diffusion open material 25 which is attached to the upper floor covering 20 by means of glue 26. such as cement based glue. Facing the concrete foundation 21. a layer of adhesive material 27 is arranged, such as cement based tile fixing agent attaching the studded plate 22 to the foundation 21. As the fixing agent 27 fills the downward hollow spaces of the studded plate and furthermore is attached to the felt material 24 of the studded plate 22, an improved anchoring of the studded plate 22 to the foundation 21 is provided, as a possible insulation layer according to prior art would have lied as a surface under the studded plate and prevented adhesive completely or partly from entering the hollow spaces of the plate 22.

Figure 3:
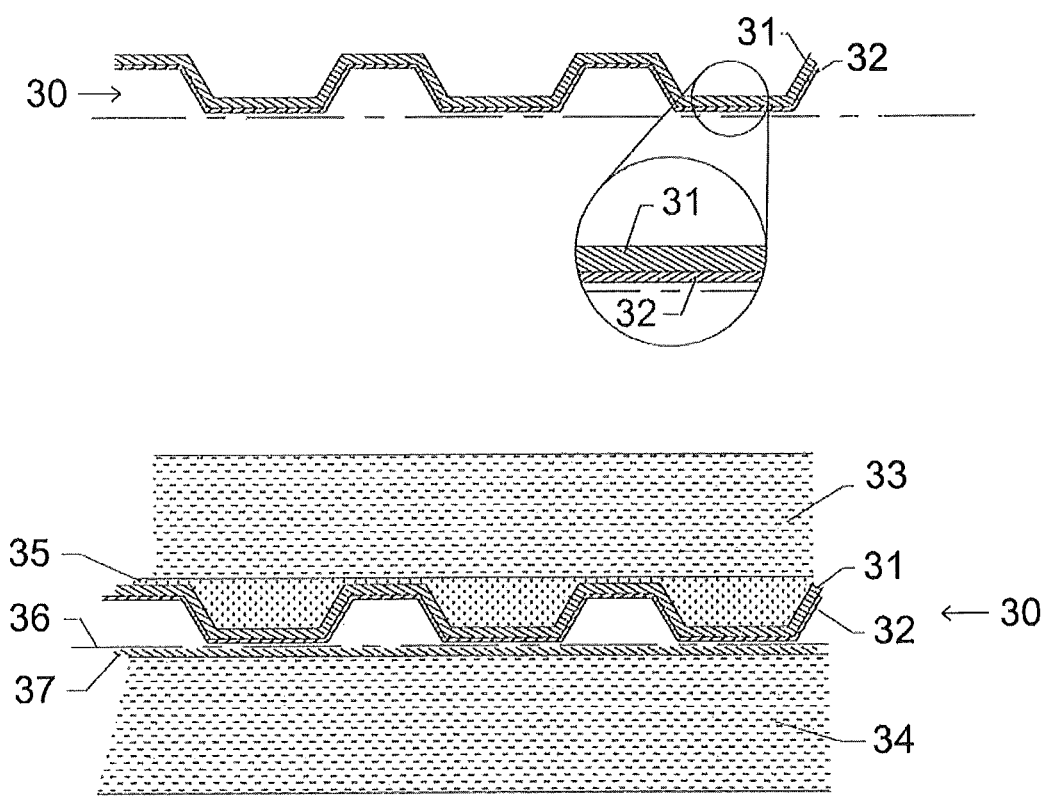
FIG. 3 shows in cross section an alternative construction of a glued floor comprising a studded plate with integrated felt according to the invention and other sound, moisture and heat insulating layers.

A further embodiment of a floor construction is shown in FIG. 3, where it is shown a cross section of an alternative construction of a glued floor comprising a studded plate 30 with an integrated layer of felt 31 over a moisture impermeable layer 32 of a polymeric material (polyethylene, polypropylene). In this embodiment, the studded plate 30 is arranged between the upper floor covering 30 and the floor foundation 34 (e.g. concrete floor) where the felt material 31 of the studded plate 30, faces the upper floor covering 33 and the moisture impermeable polymeric layer faces the floor foundation (concrete). In this embodiment, the upper floor covering 33 is glued to the studded plate 30 by means of a suitable adhesive material 35. Again, the structure of the studded plate according to the invention provides an improved adhesion to the upper floor covering as the felt layer 31 provides better adhesive properties for the glue 35, the glue 35 can enter and fill the studs of the studded plate 30 and give an optimum adhesion to the upper floor covering 33. Such embodiment of the studded plate/floor construction will also provide the possibility for laying of levelling material over the studded plate to obtain a plane floor. On the underside of the studded plate 30 of this embodiment, there is arranged a layer of a screen or fabric 36, such as a fibre cloth which is glued by means of a suitable adhesive agent 37 to the concrete foundation 34.

Generally speaking, the floor construction shown in FIG. 3 is an inverted version of the floor construction shown in FIG. 2. A corresponding studded plate can also be used in the two structural embodiments, but they will then be turned upside down.

Figure 4:
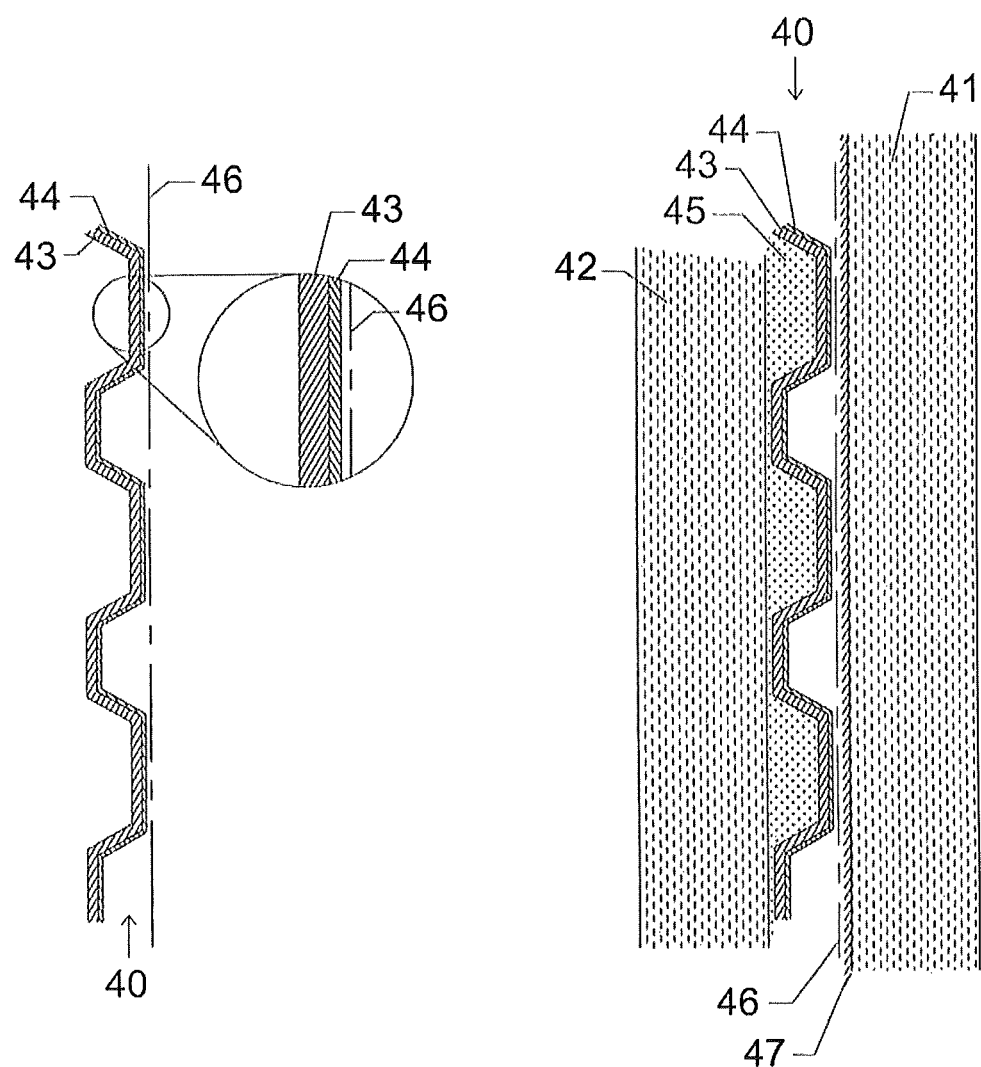
FIG. 4 shows in cross section the structure of a wall construction comprising a studded plate according to the invention arranged between the wall foundation and the final coat of the wall with other pertaining layers of the wall construction.

In FIG. 4 is shown the structure of a wall construction comprising a studded plate 40 according to the invention arranged between the wall foundation 41 and the final coat 42 of the wall. The studded plate 40 according to the invention comprises a two-layer material of integrated felt 43 and foil 44. The plate 40 is attached to the final coat 42 by means of a filling material 45 adhering to the felt layer 43 of the studded plate 40 and to the inner side of the wall material (final coat) 42 and filling the studs of the studded plate 40 on the side facing the final coat 42 of the wall. The foil side 44 of the studded plate according to the invention faces the wall foundation 41, and between the foil side 44 of the studded plate and the wall foundation 41, there is arranged a fibre cloth 46 being glued to the wall foundation 41 with an adhesive agent 47, such as a cement based glue. In an alternative embodiment, the fibre cloth 46 can initially be attached to the foil side 44 of the studded plate 40 to form a plate product that can be applied directly on the adhesive agent 47.

Figure 5:
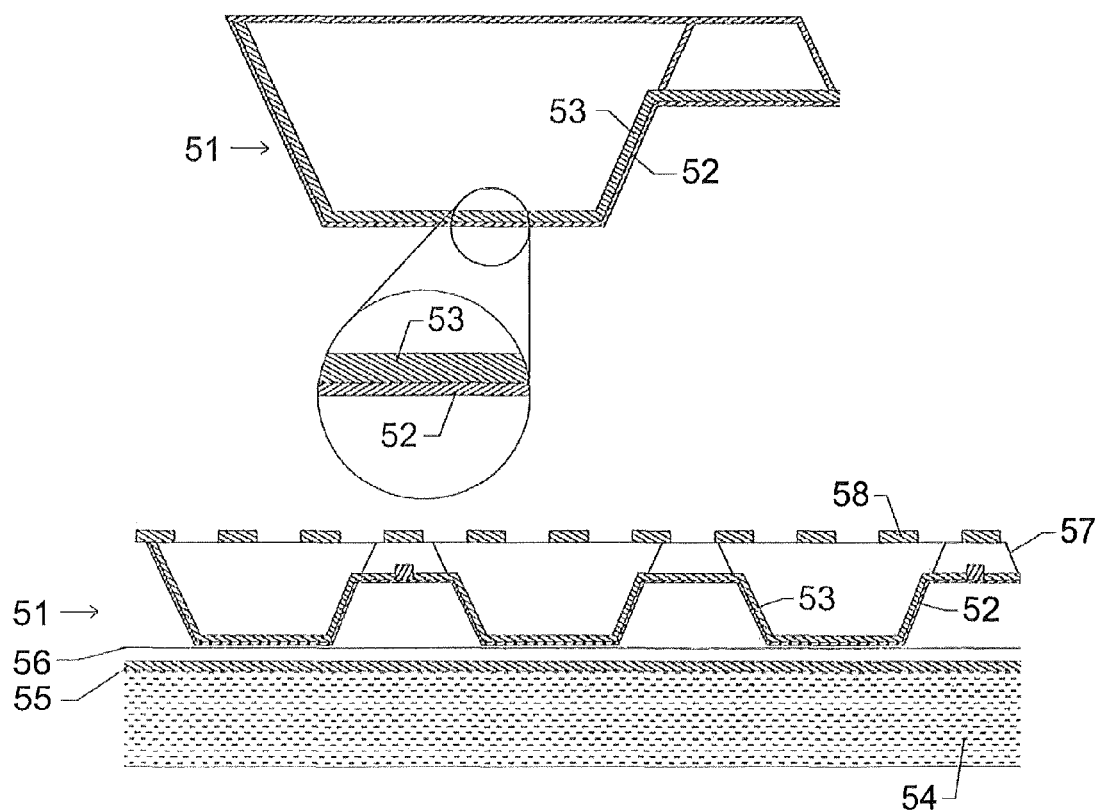
FIG. 5 shows in cross section the structure of a roof construction for "green roofs" with a base applied with a roofing with a root protection underlying an integrally formed felt and foil plate according to the invention applied with a fibre cloth and a plant medium.

In FIG. 5, it is shown in cross section a construction/structure of a green roof, where it is used a studded plate 51 with a layered composition including a foil material 52 applied with a moisture channelling felt layer 53 according to the present invention. In FIG. 5 it is furthermore shown a roof basis 54 where a roofing 55 and a layer 56 of a material providing root protection, is arranged. The root protection layer 56 is arranged to prevent roots of plants (not shown) to penetrate down into the roofing 55 and the base 54. Over the roofing 55, there is arranged a studded plate 51 with integrated formed felt 53 and foil 52. The felt layer here faces upwards to function as a wick or slab for liquid collected on the bottom of the studs of the studded plate 51. This has the advantages that water is not left on the bottom of the studs only dependent on diffusion for transport upwards to the plant medium, but can spread the moisture more evenly over the available surface and transport moisture both by means of capillary function and diffusion to the roots and overlying plant medium 58. To prevent the plant medium from filling the studs with the felt 53, a fibre cloth 57 is arranged over the studded plate 51. Such a fibre cloth has a net weight of 100-300, preferably at least 150 g/m$^2$ and on top of this, a plant medium 58 providing support for growth of plants for the formation of a green roof, is arranged.

As shown in and described about FIGS. 1 to 5, the studded plates according to the invention can be used for moisture or sound insulating or adhesive/binding layers at the construction of floating floors, in the cast or plastering of walls or coating/lining of tunnels. The studded plates according to the invention can also be formed with different types of stud design and folding lines and/or areas, as is known from prior art for conventional studded plates.

The studded plates according to the invention is discussed above in relation to plates including a layer of felt and a layer of foil. However, it is also possible to design studded plates according to the invention with multiple layers, where the plates comprises alternating layers of felt and foil. The felt material and/or the foil material can also be made of or comprise special materials, such as reinforcement fibres (Kevlar, glass fibres, metal wires, etc.) fire retarding material. electrically conductive wires/cords, heat insulating material, etc. In such cases it can be of interest to mould special materials into the polymeric foil material, incorporate them in or completely replace them with the felt material (felt is only mentioned as an example of a possible absorbent material and can, as mentioned above, be replaced by other woven, non-woven and/or foamed material). It could also, as explained below with reference to FIG. 4, be possible to arrange a plane fibre cloth in association with the foil side of the studded plate according to the invention.

One or more layers, felt or foil, can be formed or punched depending on the properties and functions being desirable to provide/promote.

The absorbent material can be a continuous surface, cloth or layer completely covering the plate it is applied to or it can be a number of parallel, crossing or in other ways arranged strips or bands. Another possibility in some applications where this is desirable, one can perforate a continuous cloth, so that the studded plate is not completely covered.

An absorbing material that after placement follows the contours of the surface of the studded plate, will provide improved qualities for a number of uses, as mentioned above. That is, both by improving adhesion, as a sound absorbing and/or thermally insulating layer or by improving the evaporation qualities of the plate on which it is provided.

Even if it is mainly referenced to the provision of an absorbing cloth or a woven or non-woven material, the same advantages and qualities can be obtained by the provision of an absorbing layer of a foam material on at least a part of the surfaces of a studded plate, so that the foam material function as the above described layers of felt or other woven or non-woven material.

It is thereby presented here a studded plate comprising a number of depressions and elevations suitable for incorporation in a wall, roof or floor structure comprising at least one water impermeable basic layer of a polymeric material. The basic layer is applied with an integrated layer of a non-woven. woven and/or foamed material with water channelling/draining and/or energy converting properties for the plate, in such a way that the integrated layer is attached to and follows the contour of the surface of the plate.

The integrated layer can be formed of a continuous fabric being attached to every point of at least one surface of the studded plate.

Figure 6:
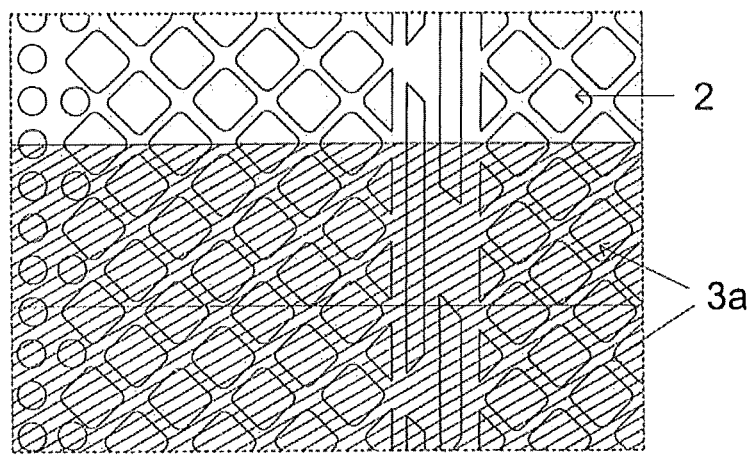
FIG. 6 shows a planar view of a studded plate according to some embodiments of the invention.

The integrated layer can also be formed of a number of strips or bands 3a (FIGS. 1 and 6) attached to the studded plate, so that the strips or bands follow the contour of the surface of the studded plate.

Alternatively, the integrated layer can be formed as a perforated fabric or cloth attached to the studded plate in such a way that the layer follows the contour of the surface of the studded plate.

The invention claimed is:

1. A studded plate suitable for incorporation in a wall, roof or floor construction, the studded plate comprising:
   at least one water impermeable base layer of a polymeric material, the base layer having first and second opposing sides, the base layer having a plurality of depressions and elevations forming a plurality of studs in the base layer in each of a longitudinal direction and a transverse direction, wherein the base layer has a contour defined by the plurality of depressions and elevations; and
   an integrated layer of a non-woven, woven or foamed material with water channeling, draining or sound or heat insulating properties, the integrated layer having first and second opposing sides, the integrated layer applied on the base layer such that substantially every point of the integrated layer is attached to at least one of the first and second sides of the base layer and such that the first and second opposing sides of the integrated layer follow the contour of the base layer.

2. The studded plate according to claim 1, wherein the integrated layer is formed of a number of strips or bands.

3. The studded plate according to claim 1, wherein the integrated layer is formed as a perforated fabric or cloth.

4. The studded plate according to claim 1, wherein the integrated layer is felt.

5. The studded plate according to claim 1, wherein the studs of the base layer are formed as squares, circles or polygons.

6. The studded plate according to claim 1, wherein the studded plate comprises folding areas or punched areas.

7. The studded plate according to claim 1, wherein at least one of the layers comprises a material with absorbing, insulating, conductive or fire retarding properties.

8. The studded plate according to claim 1, wherein the integrated layer has a substantially uniform thickness.

9. A floor construction comprising:
   an upper layer;
   a floor foundation; and
   a studded plate positioned between the upper layer and the floor foundation, wherein the studded plate comprises:
      at least one water impermeable base layer of a polymeric material, the base layer having first and second opposing sides, the base layer having a plurality of depressions and elevations forming a plurality of studs in the base layer in each of a longitudinal direction and a transverse direction, wherein the base layer has a contour defined by the plurality of depressions and elevations; and
      an integrated layer of a non-woven, woven or foamed material, the integrated layer having first and second opposing sides, the integrated layer applied on the base layer such that substantially every point of the integrated layer is attached to at least one of the first and second sides of the base layer and such that the first and second opposing sides of the integrated layer follow the contour of the base layer.

10. A roof construction comprising:
   a roofing layer; and
   a studded plate, wherein the studded plate comprises:
      at least one water impermeable base layer of a polymeric material, the base layer having first and second opposing sides, the base layer having a plurality of depressions and elevations forming a plurality of studs in the base layer in each of a longitudinal direction and a transverse direction, wherein the base layer has a contour defined by the plurality of depressions and elevations; and
      an integrated layer of a non-woven, woven or foamed material, the integrated layer having first and second opposing sides, the integrated layer applied on the base layer such that substantially every point of the integrated layer is attached to at least one of the first and second sides of the base layer and such that the first and second opposing sides of the integrated layer follow the contour of the base layer, wherein the base layer is positioned between the integrated layer and the roofing layer.

* * * * *

UNITED STATES PATENT AND TRADEMARK OFFICE
CERTIFICATE OF CORRECTION

PATENT NO.         : 8,516,760 B2                                Page 1 of 1
APPLICATION NO.    : 12/746327
DATED              : August 27, 2013
INVENTOR(S)        : Julton It is certified that error appears in the above-identified patent and that said Letters Patent is hereby corrected as shown below:

On Title Page:
Item (73) Assignee: correct "Isola AS, Notoddne (NO)"
                    to read -- Isola AS, Notodden (NO) --

Signed and Sealed this
Twenty-second Day of April, 2014

Michelle K. Lee
*Deputy Director of the United States Patent and Trademark Office*